United States Patent [19]
Jeavons

[11] 4,088,356
[45] May 9, 1978

[54] PIVOTAL CONNECTIONS

[75] Inventor: Philip Swingewood Jeavons, Birmingham, England

[73] Assignee: Wilmot-Breeden Limited, Birmingham, England

[21] Appl. No.: 724,067

[22] Filed: Sep. 16, 1976

[30] Foreign Application Priority Data

Sep. 16, 1975 United Kingdom ............... 37908/75

[51] Int. Cl.² ............................................. E05C 13/00
[52] U.S. Cl. ....................................... 292/359; 403/69
[58] Field of Search ...................... 292/216, 280, 336.3, 292/DIG. 25, DIG. 38, 1; 403/69, 70, 71

[56] References Cited

U.S. PATENT DOCUMENTS

| 3,007,725 | 11/1961 | Becker et al. | 403/69 |
| 3,461,514 | 8/1969 | Morris | 24/217 X |
| 3,608,941 | 9/1971 | Yokohama | 292/216 X |
| 3,695,652 | 10/1972 | Rotnikas | 403/71 |
| 3,929,361 | 12/1975 | Klebba | 292/216 |

FOREIGN PATENT DOCUMENTS 571,621  3/1959  Canada ........................... 292/341.18

Primary Examiner—Richard E. Moore
Attorney, Agent, or Firm—Young & Thompson

[57] ABSTRACT

A plastics moulding, such as a lever, includes an aperture with an integral web or fin extending partially across or into the aperture. The cranked end portion of, for example, a rod is inserted into the aperture and is acted on by the web or fin which serves to restrain vibration of the rod relative to the lever.

4 Claims, 2 Drawing Figures

U.S. Patent
May 9, 1978
4,088,356
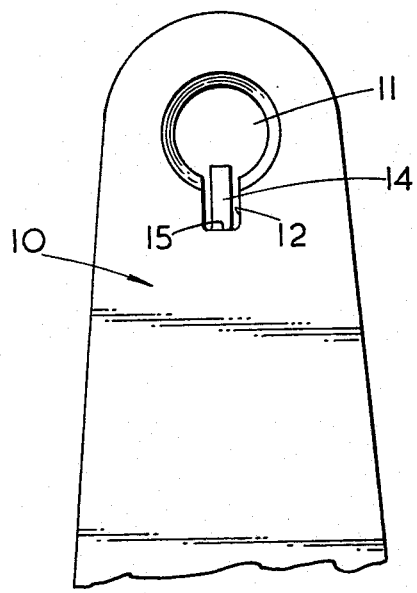
-FIG. 1-
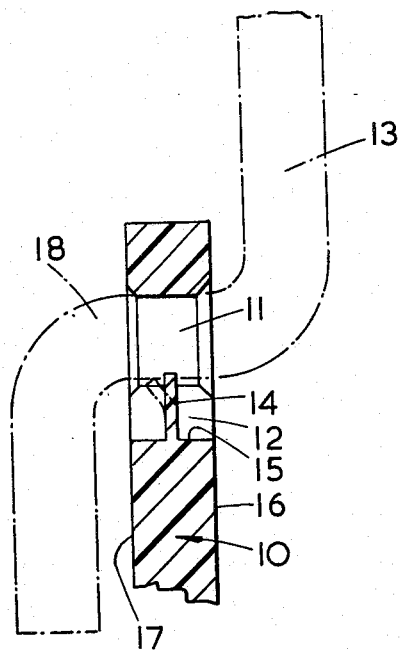
-FIG. 2-

PIVOTAL CONNECTIONS

This invention relates to pivotal connections and has been developed in relation to pivotal connections between plastics levers and metal rods forming part of door latch operating mechanisms for motor vehicles. However, the invention is of general application to pivotal connections between a pair of members of which at least one is a plastics moulding.

Clip fixing systems have been used extensively for interconnecting linkage members of latch operating mechanisms. However, problems have arisen when the clips have been inserted incorrectly; either the linkage members have been inadequately connected and have come apart or the clips, which have an anti-rattle purpose, have come loose and rattles have occurred.

It is accordingly an object of the invention to provide an improved method of effecting a pivotal connection between a pair of members, which method is of particular but by no means exclusive application to the pivotal connection of components of vehicle door latch operating mechanisms.

According to a first aspect of the invention there is provided a method of effecting a pivotal connection which includes providing a first member which is formed as a plastics moulding and includes an aperture, with a web or fin extending partially across or into the aperture and constituting an integral part of said moulding, providing a second member which has a cranked end portion, and inserting the cranked end portion into the aperture so that it is acted on by the web or fin which serves to restrain vibration of the cranked end portion relative to said first member.

The plastics moulding is conveniently so formed that the web or fin is a fraction of the thickness of the remainder of the moulding and constitutes, in effect, a resilient projection extending from one portion of the surround of the aperture. When the cranked end portion of the second member is inserted in the aperture, the web or fin is resiliently displaced but, at the same time, it acts to bias the cranked end portion into engagement with the opposite portion of the surround of the aperture.

The aperture in the first member is preferably of key-hole shape in cross-section, the web or fin being contained within the projecting portion of the aperture, which portion is afforded by a parallel-sided slot with the web or fin integral with the base of the slot and of such length that the free end thereof projects into the cylindrical portion of the aperture.

According to a second aspect of the invention there is provided the combination of a first member and a second member pivotally connected thereto, the first member being formed as a plastics moulding and including an aperture with a web or fin constituting an integral part of the moulding extending partially across or into the aperture, and the second member including a cranked end portion which is inserted into the aperture so as to be acted on by the web or fin which serves to restrain vibration of the cranked end portion relative to said first member.

As mentioned above, the invention has been developed in relation to door latch operating mechanisms for motor vehicles and the plastics moulding is thus conveniently a lever forming part of the latch mechanism whilst the second member is a metal rod interconnecting the lever and, for example, a sill button.

No clips are required to prevent the metal rod from rattling and problems which have arisen in the past as a result of inadequate or careless fitting of the clips are thus avoided.

The invention will now be described by way of example with reference to the accompanying drawings, in which:

FIG. 1 illustrates a portion of a lever forming part of the operating mechanism of a motor vehicle door latch, and FIG. 2 illustrates a pivotal connection between the lever and a rod extending, in use, between the lever and a sill button.

As shown in the drawings, the lever 10, which is formed as a plastics moulding, has an aperture of key-hole shape comprising a generally cylindrical portion 11 and a projecting portion 12. The generally cylindrical portion 11 has outwardly flared ends to facilitate fitment of the rod 13 therein and the projecting portion 12 is in the form of a parallel-sided slot which has a fin 14 disposed centrally thereof. The fin 14 is moulded integrally with the base 15 of the slot and is located at a position equi-distant from the front and rear faces 16 and 17 of the lever. The fin 14 is of rectangular form as shown and it has a length such that it projects a predetermined distance into the cylindrical portion 11 of the aperture.

The rod 13, which is bent to provide a cranked end portion 18, has a diameter which is slightly less than the diameter of the cylindrical portion 11 of the aperture (as can be seen from FIG. 2), the relative dimensions of the rod 13 and aperture being such as to permit ready fitment of the cranked end portion 18 in the aperture. However, the length of the fin 14 in its relaxed or undeformed state is more than the distance between the base 15 of the slot and the adjacent surface of the cranked end portion 18. Thus, when the rod 13 is fitted into the aperture, the fin 14 is resiliently deflected by the rod 13. However, the fin 14 remains in engagement with the rod 13 and continuously biases it towards the side of the aperture remove from the projecting portion 12. Thus, the rod 13 is resiliently held within the aperture and, in use, will not tend to vibrate relative to the lever 10 or otherwise rattle.

The lever 10 may be of polypropylene or of any other structurally stable, resiliently deformable synthetic plastics material.

What we claim is:

1. The combination of a lever forming part of a door latch operating mechanism and a metal rod pivotally connected thereto, the lever being formed as a plastics moulding and including an aperture of key-hole shape in cross-section which comprises a main cylindrical portion and a projecting portion afforded by a parallel-sided slot, said plastics moulding including, as an integral part thereof, a web or fin extending from the base of said parallel-sided slot and of such length that the free end thereof projects into the cylindrical portion of the aperture, and the rod having a cranked end portion which is inserted into the aperture so as to be acted upon by the web or fin which thereby serves to restrain vibration of the cranked end portion of the rod relative to the lever.

2. The combination of a lever forming part of a door latch operating mechanism and a metal rod pivotally connected thereto, wherein the metal rod has a cranked end portion of circular cross-section and the lever is formed as a plastics moulding which has an aperture into which the cranked end portion of the rod is inserted, the surround of said aperture including an integral resiliently displaceable element which is deflected upon insertion of the cranked end portion of the rod into the aperture and serves to prevent vibration of the rod relative to the lever.

3. The combination according to claim 2, wherein the aperature in the lever has outwardly flared ends to facilitate insertion of the rod in the aperture.

4. The combination according to claim 3, wherein the aperture in the lever is of key-hole shape and the integral resiliently displaceable element is a rectangular fin one end of which projects into the cylindrical portion of the aperture.